United States Patent [19]
Cheng

[11] Patent Number: 5,531,497
[45] Date of Patent: Jul. 2, 1996

[54] TWO-POSITION COLLAPSIBLE CANOPY ASSEMBLY THAT ATTACHES TO A PICKUP TRUCK

[76] Inventor: John C. Cheng, Nine W. State St., Pasadena, Calif. 91105

[21] Appl. No.: 380,974

[22] Filed: Jan. 30, 1995

Related U.S. Application Data

[63] Continuation-in-part of Ser. No. 59,650, May 10, 1993, abandoned.

[51] Int. Cl.⁶ ......................................... B60P 7/02
[52] U.S. Cl. .......................... 296/100; 296/39.2; 296/105
[58] Field of Search .................................. 296/39.2, 100, 296/105, 164, 165

[56] References Cited

U.S. PATENT DOCUMENTS

| | | | |
|---|---|---|---|
| 4,252,363 | 2/1981 | Rodrigue | 296/100 |
| 4,659,136 | 4/1987 | Martin et al. | 296/100 |
| 4,779,752 | 10/1988 | Vallee et al. | 296/39.2 X |
| 4,789,196 | 12/1988 | Fields | 296/100 |
| 4,802,705 | 2/1989 | Elwell | 296/39.2 |
| 4,887,947 | 12/1989 | Bott | 296/39.2 X |
| 5,228,739 | 7/1993 | Love | 296/100 |

FOREIGN PATENT DOCUMENTS

| 91/09751 | 7/1991 | WIPO | 296/100 |
|---|---|---|---|

*Primary Examiner*—Andrew C. Pike
*Attorney, Agent, or Firm*—Albert O. Cota

[57] ABSTRACT

A two-position collapsible canopy assembly (10) is designed to be attached to the side rails (15) of a pickup truck (11). The assembly basically consists of a fore hard shell (12) that attaches to the rear of the truck cab, an aft hard shell (14), and a flexible canopy (16) therebetween that is supported by a plurality of ribs (22). The aft hard shell (14) and the ribs (22) are slidably disposed upon a pair of tracks (64) that are supported on the truck's side rails (15). The assembly (10) may be placed in a fully extended position or in a retracted position. When in the retracted position a security mid-gate (70) and mid-gate liner (72) may be attached below the aft hard shell (14) that provides a secure enclosed area into which items may be stowed. The mid-gate liner (72) affixed to the top of the corrugated truck bed deck (21) within the enclosed area allows the stowed items to remain dry in the event of inclement weather.

5 Claims, 14 Drawing Sheets

Fig. 5

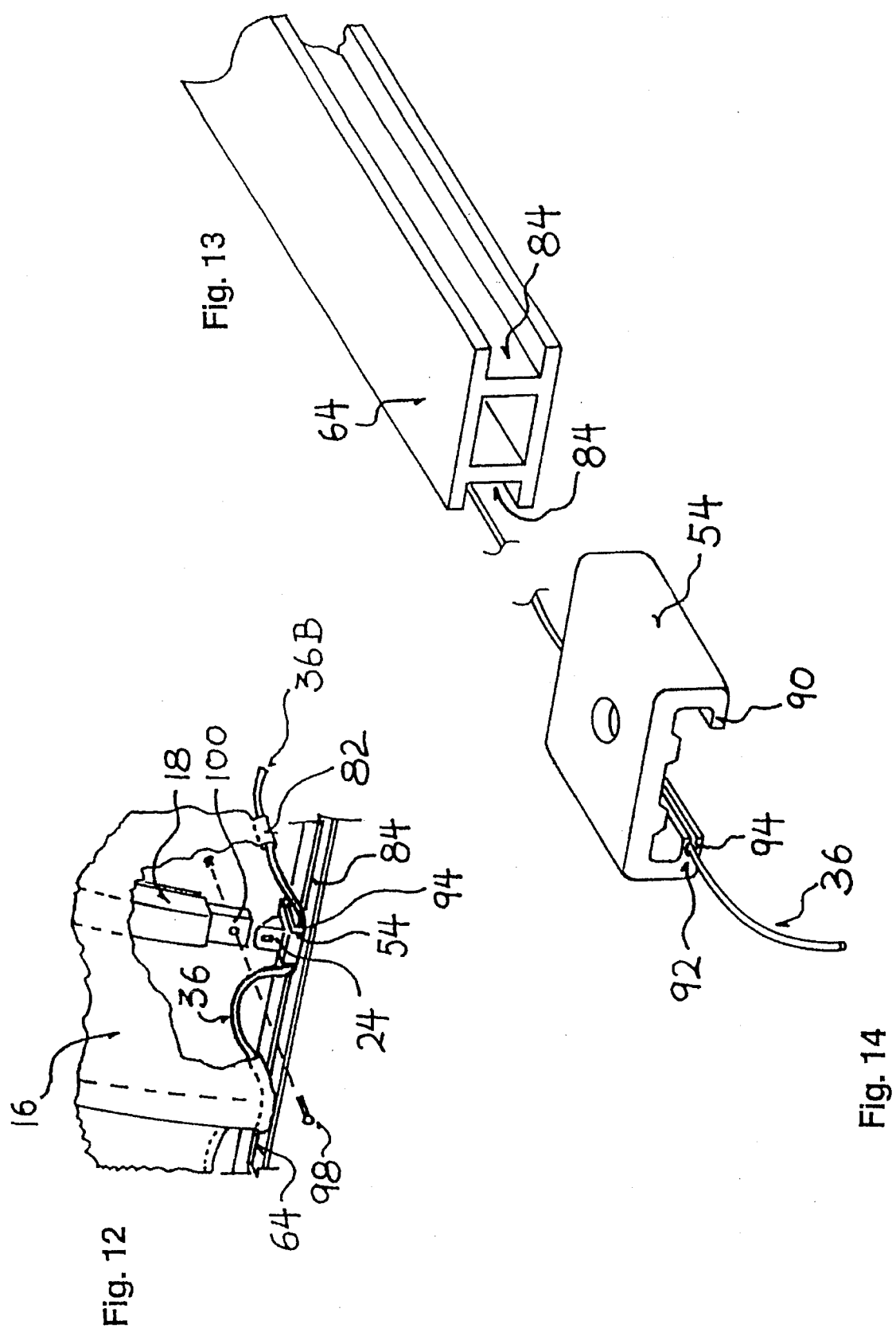

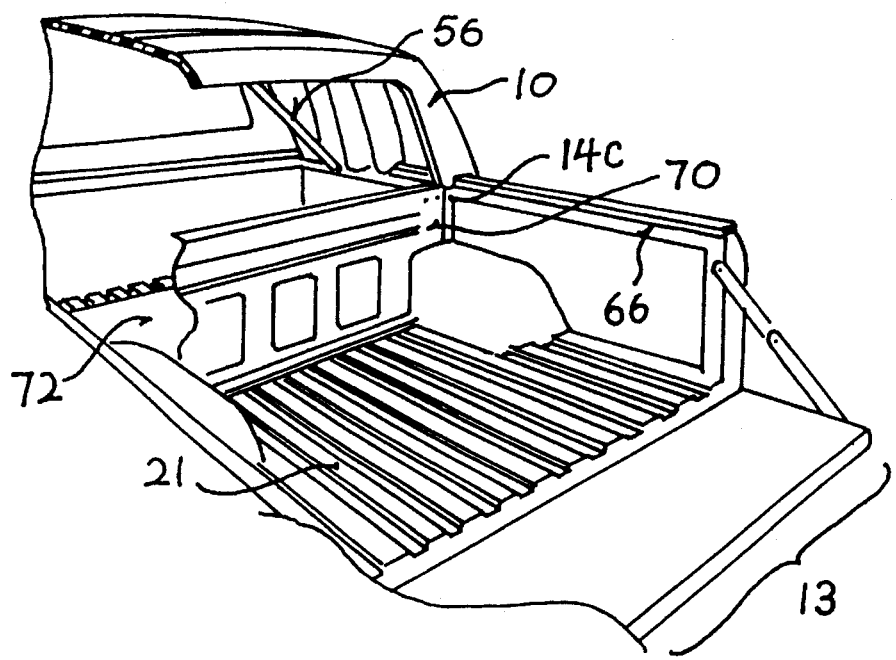
Fig. 26
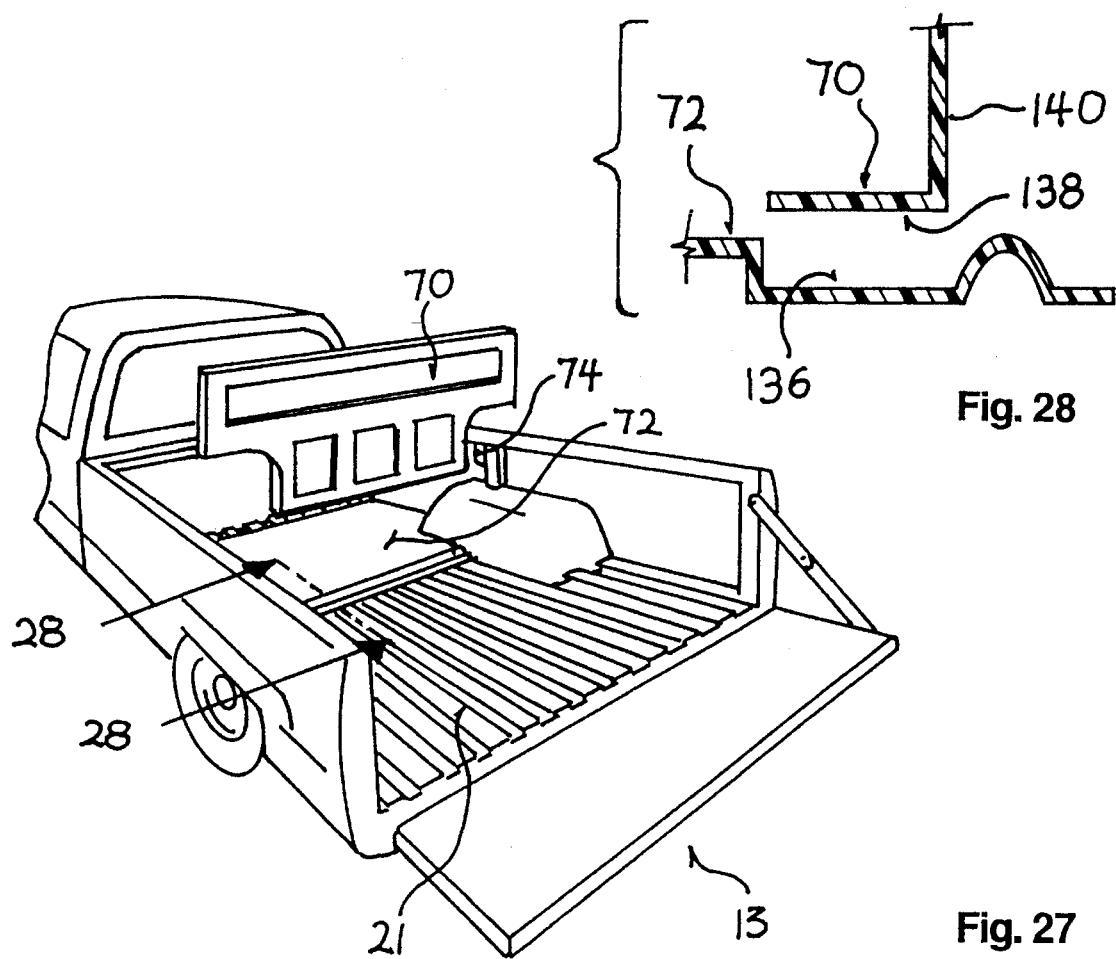
Fig. 28
Fig. 27

TWO-POSITION COLLAPSIBLE CANOPY ASSEMBLY THAT ATTACHES TO A PICKUP TRUCK

This application is a continuation-in-part of U.S. application Ser. No. 08/059,650 having a filing date of May 10, 1993 now abandoned.

TECHNICAL FIELD

The invention pertains to the general field of truck bed canopies and more particularly to a two-position collapsible canopy assembly which fits over the bed of a pickup truck. The canopy may be selectively secured in either a retracted or extended position to cover a portion or the entire bed of the pickup truck.

BACKGROUND ART

The prior art disclosed various types of longitudinally collapsible covers attached to the bed of a pickup truck. The covers are designed to cover the entire truck bed or alternatively may be collapsed and stowed in the collapsed position to open the same for use as may be desired for any particular application.

A search of the prior art did not disclose any patents that read directly on the claims of the instant invention; however, the following U.S. patents were considered related:

| U.S. PAT. NO. | INVENTOR | ISSUED | |
|---|---|---|---|
| 4,887,947 | Bott | 19 December | 1989 |
| 4,659,136 | Martin et al. | 21 April | 1987 |
| 4,648,649 | Beal | 10 March | 1987 |
| 4,252,363 | Rodrigue | 24 February | 1981 |

The Bott U.S. Pat. No. 4,887,947 discloses a cargo restraint system for the bed of a pickup truck. The system consists of a pair of recess members that are each secured to opposing truck side walls. An elongated stop block is releasably assembled into a multiplicity of grooves located in the recess members. The stop block can be adjustably moved in the recess members to provide a stop for cargo located within the space between the truck cab and the stop block. If desired, a bed liner may also be included in the combination.

The Martin U.S. Pat. No. 4,659,136 et al, discloses an apparatus for covering a part of the open bed of a land or marine vehicle. The apparatus includes an enclosure structure telescopically collapsible and extendable with an access opening and door. An end gate assembly is selectively positionable and releasably securable at a number of continuously variable longitudinal locations on the open bed. The apparatus also includes an improved track assembly for the telescopically collapsible and extendable enclosure sections.

The Beal U.S. Pat. No. 4,648,649 discloses a camper-truck assembly and mounting hardware. The mounting hardware consists of a first set of rail members secured to the top surface of the truck bed rails; and a second set of rails secured to the underside of the camper top for sliding-locking engagement therewith. The rail members include cam fasteners that releasably lock the rails against relative movement therebetween. The mounting rails may be provided as kits or as original equipment by the truck manufacturer or dealer.

The Rodrigue U.S. Pat. No. 4,252,363 discloses a collapsible cover structure which includes a flexible sheet material secured to a plurality of inverted ribs.

The ribs are supported upon a track mechanism attached to a pickup truck bed so that the cover may be extended or retracted. This patent also includes fore and aft hard shell end portions. These end portions, when the cover is collapsed, form an enclosed space to protect the flexible material from adverse weather and environmental conditions. The aft portion is secured to the forward portion by a hook on each side to secure the same in its collapsed condition.

The prior art collapsible covers for pickup trucks, including those disclosed in the above-referenced U.S. patents, are difficult to maneuver from either the extended or retracted position to the opposite position. Furthermore, when the cover is in its retracted position, the entire area of the truck bed is open and non-secure. Additionally, when in the extended position, the flexible sheet material providing the collapsible cover is not tightly secured to the truck bed thereby allowing ingress of foreign materials such as snow, dirt, and the like.

For background purposes and as indicative of the art to which the invention relates, reference may be made to the following remaining patents found in the search:

| U.S. PAT. NO. | INVENTOR | ISSUED | |
|---|---|---|---|
| 4,944,612 | Abstetar et al. | 31 July | 1990 |
| 4,802,705 | Elwell | 7 February | 1989 |
| 4,789,196 | Fields | 6 December | 1988 |
| 4,709,956 | Bowman | 1 December | 1987 |
| 4,397,497 | Alonzo, Jr. et al. | 9 August | 1983 |
| 4,188,058 | Resa | 12 February | 1980 |
| 3,901,548 | Seaman | 26 August | 1975 |
| 3,688,787 | Feather | 5 September | 1972 |
| 3,231,305 | Beckman | 25 January | 1966 |
| 3,201,171 | Wickard | 17 August | 1965 |

SUMMARY OF THE INVENTION

The two-position collapsible canopy assembly is designed to be movably attached to the upper truck bed rails of a pickup truck. The canopy of the assembly may be placed in either a retracted position or an extended position. In the retracted position the assembly, in combination with a mid-gate and a liner, it provides an enclosed lockable section that covers approximately one-third of the truck bed; in the fully extended position, the entire truck bed is covered. In either position, the peripheral edges of the canopy are tightly attached to the truck's side rails to prevent the ingress of foreign objects during the operation of the truck.

The assembly in its basic form consists of:

a) a track having means for being secured to the top of the upper truck bed rails, b) a fore hard shell having a front section, a back section and a bottom section, wherein the front section is placed against the backside of the truck cab and the bottom section has means for being securely attached to the upper truck bed rails, c) an aft hard shell having a front section, a back section, and a bottom section having means for being slidably attached to the track, d) a plurality of ribs slidably supported to the track, e) a flexible canopy having terminating side ends, a front end, and a back end, where the side ends are attached to the ribs and tracks by an attachment means and the front and back ends are rigidly attached to the fore hard shell and the aft hard shell respectively by an attachment means. The attached canopy can be placed in either a forward retracted position or in an extended position that covers the length of the truck bed, and f) a mid-gate having means for being removably secured around the bottom section of the fore hard shell, the truck's side walls, and the corrugated truck bed deck.

Attached to the back of the aft hard shell, in the preferred embodiment, is a combination rear door/window where the window can be upwardly opened when desired. also, below the mid-gate may be installed a mid-gate liner.

To place the assembly in the retracted position, the aft hard shell is grasped and moved forward for attachment to the fore hard shell. When the canopy assembly is in the retracted position, with the mid-gate installed, the enclosed section allows various materials and parts to be securely stowed. The mid-gate liner allows the stowed items to remain dry in the event of inclement weather. The liner functions by forming a false bottom that allows water to move and flow freely below the liner along the lower level of the corrugated truck bed, thus allowing the items placed on top of the liner to remain isolated from any flowing water.

To place the canopy assembly in its fully extended position, the aft hard shell is released from the fore hard shell and mechanically slid on the tracks to the rear of the truck bed. In this extended position, the entire truck bed is enclosed by the integral combination of the fore aft shell, the flexible canopy, and the aft hard shell. With the truck bed fully covered, items may be stored within the enclosed and relatively secured structure.

In view of the above disclosure, it is the primary object of the invention to provide a two-position collapsible cover assembly that attaches to the bed of a pickup truck and that can be placed in either a retracted or extended position. In addition to the primary object, it is also an object of the invention to provide an assembly that:

is simple to install and operate, is reliable and relatively maintenance free, increase the convenience and versatility of a pickup truck use, has no moving parts that can bind or jam, has a fully enclosed track system to keep sand or any foreign matter from impeding smooth operation, is cost effective from both a manufacturer's and consumer point of view.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 5 is a perspective view showing the various elements used to attach the assembly in an extended position onto a truck bed side rail.

FIG. 12 is a partial perspective view showing the attachment of the rib to the rib saddle and the threading of the cable through the flaps and gliders.

FIG. 13 is a perspective view of a track.

FIG. 14 is a perspective view of a glider showing the details of a cable inserted into the glider's C-channel.

FIG. 26 is a perspective view showing the mid-gate attached with a mid-gate liner in place.

FIG. 27 is a perspective view showing the mid-gate being lowered into a lateral transverse recess located in the mid-gate liner.

FIG. 28 is a sectional side view taken along section 28—28 of FIG. 27 showing the details of the lateral transverse recess.

BEST MODE FOR CARRYING OUT THE INVENTION

Figure 1:
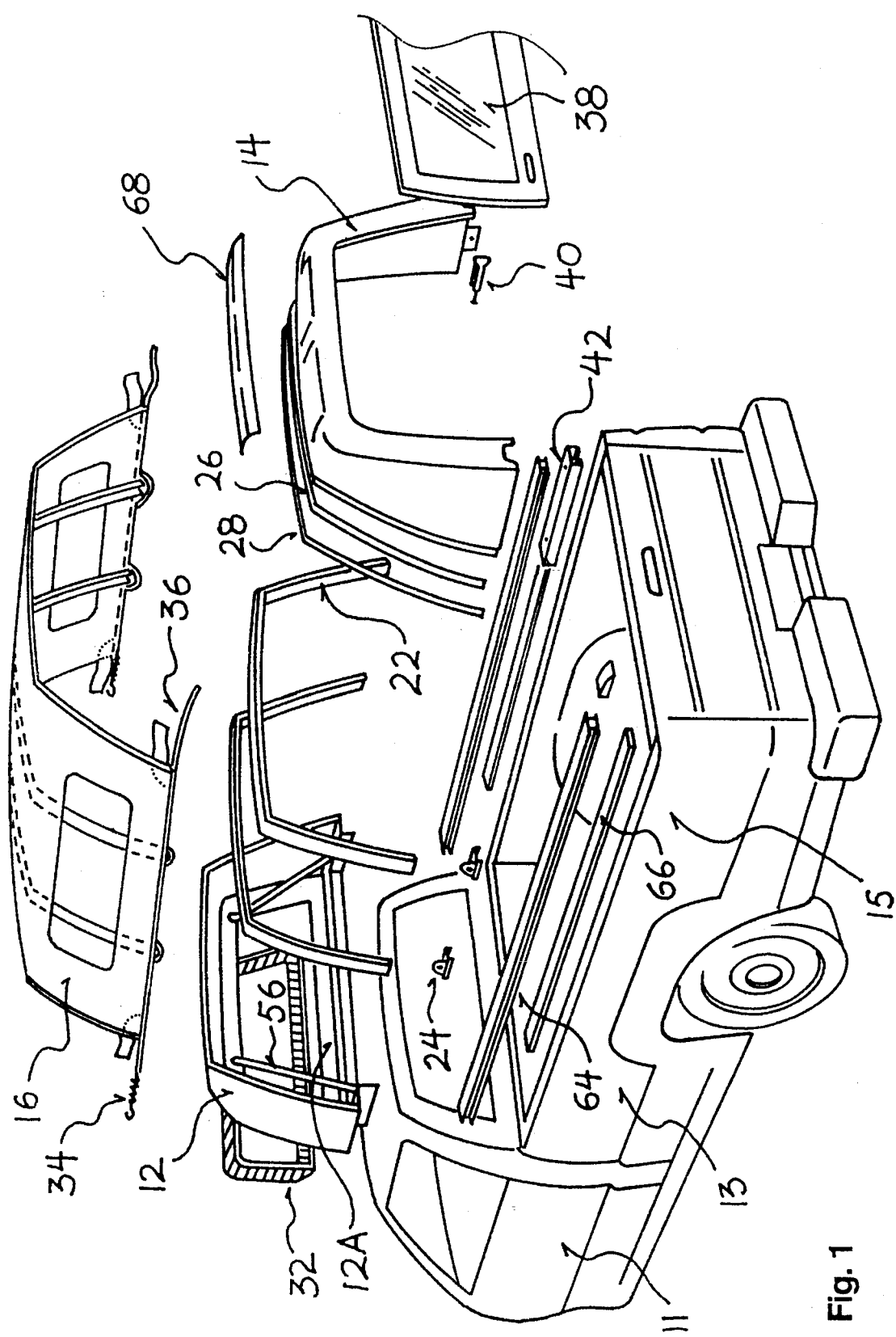
FIG. 1 is an exploded view of the major elements comprising a two-position collapsible canopy assembly as attached to a pickup type truck.

The best mode for carrying out the invention is presented in terms of a preferred embodiment that allows a two-position collapsible canopy assembly 10 to be attached to a pickup type truck in either a retracted or extended position. The preferred embodiment, as shown in FIGS. 1–31, is comprised of the following major elements: a fore hard shell 12, an aft hard shell 14, a flexible canopy 16 that is supported on a plurality of ribs 22, a mid-gate 70, and a mid-gate liner 72. The inventive elements are used in combination with a pick type truck 11, that includes a truck bed 13, having front, rear, and side walls, truck bed side rails 15, and a corrugated truck bed deck 21. The major elements with the exception of the mid-gate and mid-gate liner are shown in their relative positions in an exploded view in FIG. 1.

Figure 2:
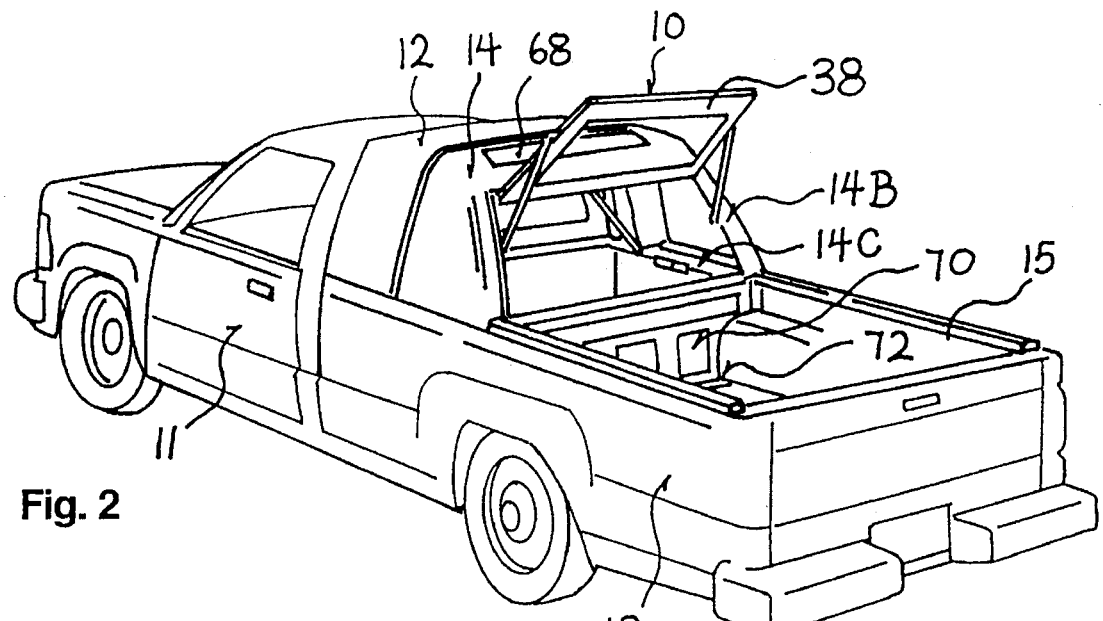
FIG. 2 is a perspective view of the assembly attached to a pickup type truck with the canopy in the retracted position.
Figure 3:
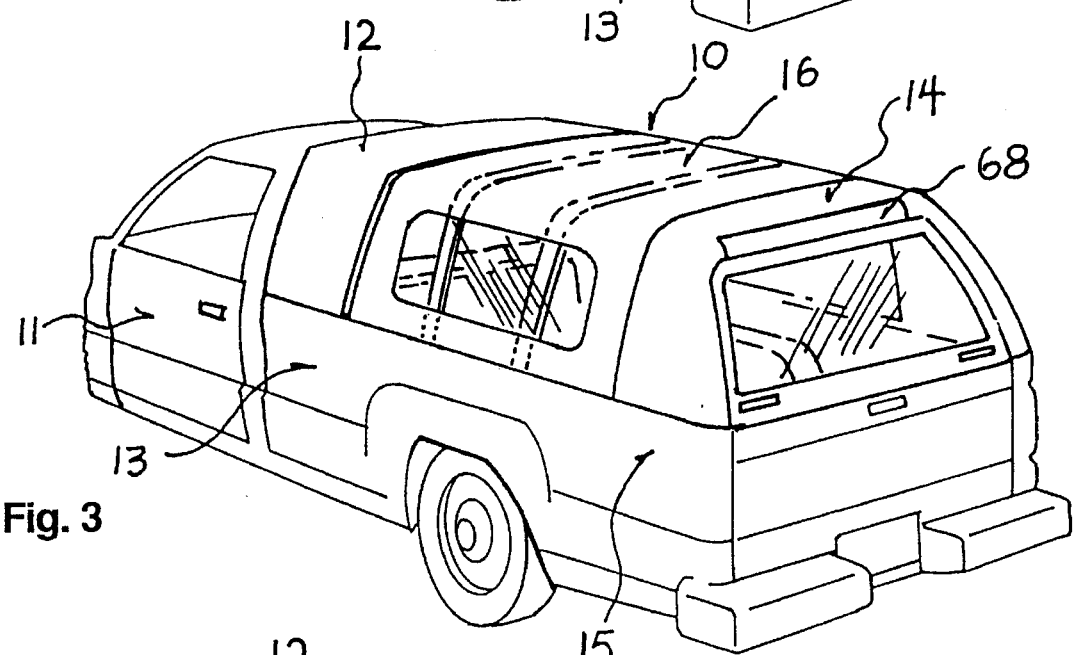
FIG. 3 is a perspective view of the assembly attached to a pickup type truck with the canopy in the extended position.

The assembly 10 with the collapsible canopy 16 in its retracted position is shown in FIG. 2 and in its fully extended position in FIG. 3. When the canopy is in the retracted position it provides both an enclosed lockable section and a rear open section. The lockable front section encloses approximately one-third of the truck bed 13 and includes the mid-gate 70, which may be removably secured in place between the bottom section 14C of the aft hard shell 14 and a mid-gate liner 72 as shown in FIG. 2. The aft hard shell 14 in the preferred embodiment also includes, at its back section 14B, a rear door/window combination 38 as shown in FIG. 2. If desired, the window portion of the combination 38 may be removed. As also shown in FIG. 2, a wind deflector/spoiler 68, if desired, may be affixed to the top surface of the aft hard shell portion 14.

Figure 4:
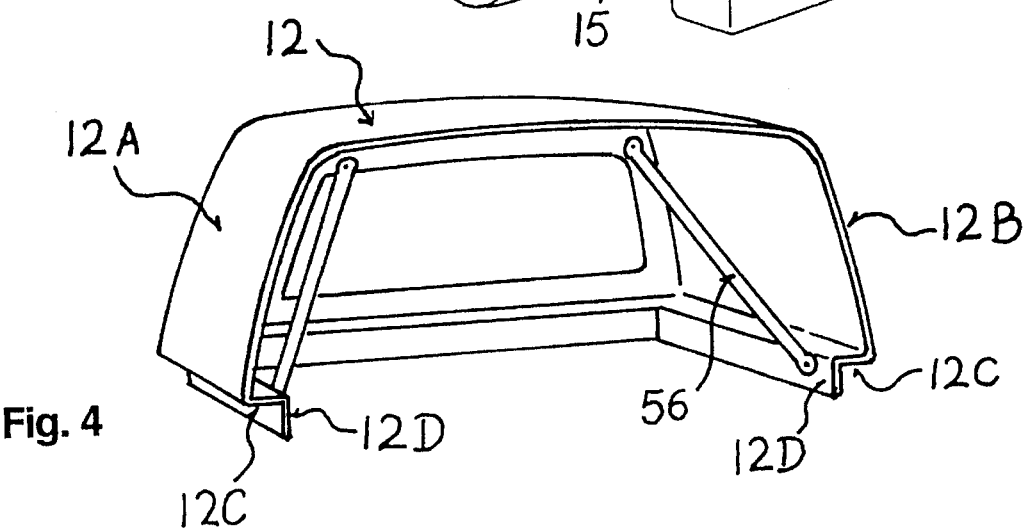
FIG. 4 is a perspective view showing the placement of a pair of diagonal braces within the fore hard shell.
Figure 5:
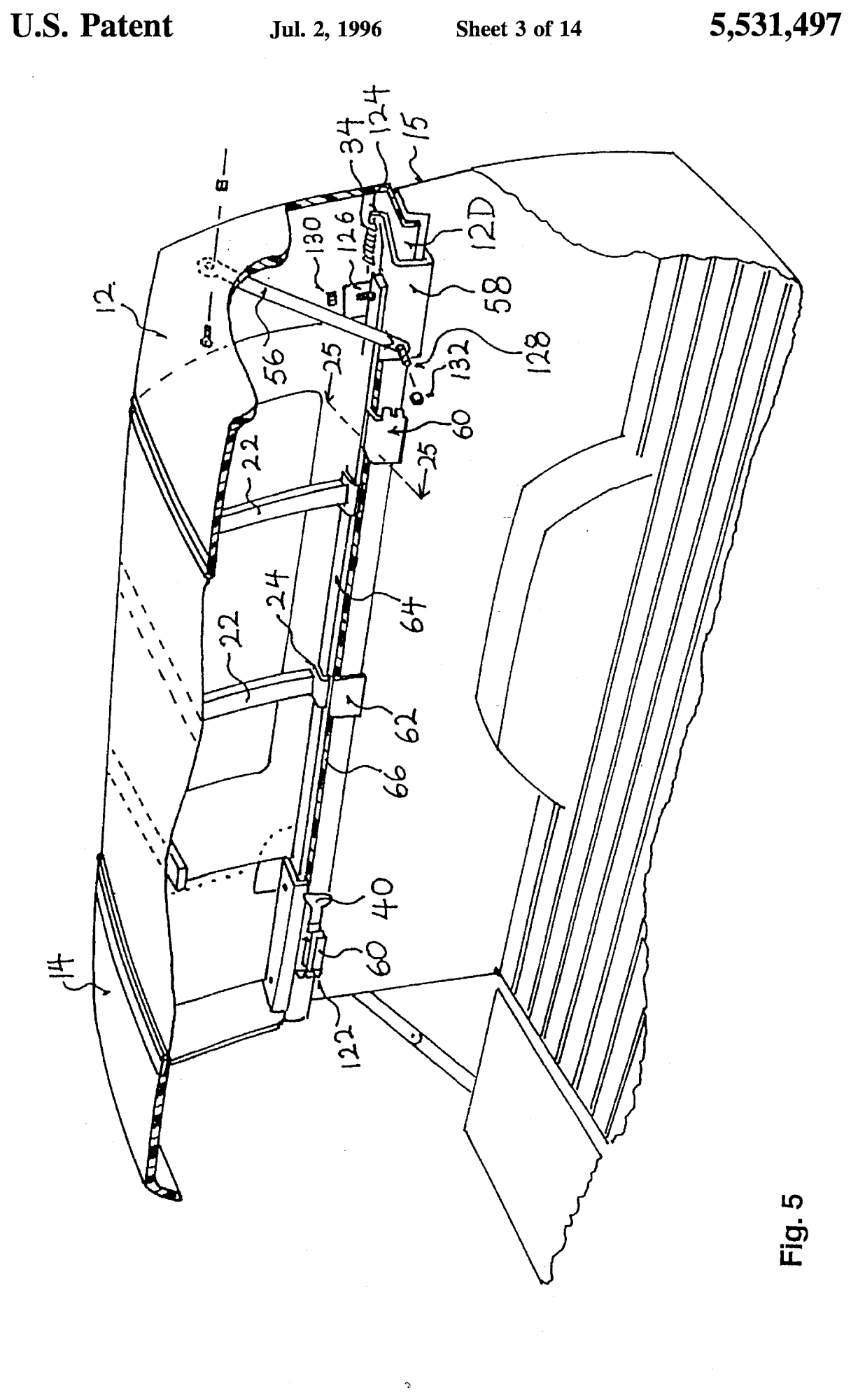

The fore hard shell 12 includes on each side of its bottom section 12C an inward lip 12D as shown in FIG. 4 that is sized to fit over the upper truck side rails 15. To rigidly attach the hard shell, a C-clamp 58 is placed over and tightened around the inward lip 12D and the truck bed rails 15 as shown in FIG. 5. Also, to assure a tight seal, a rubber gasket 32 may be placed between the backside of the front cab and the front section 12A of the fore hard shell 12 as shown in FIG. 1.

Figure 6:
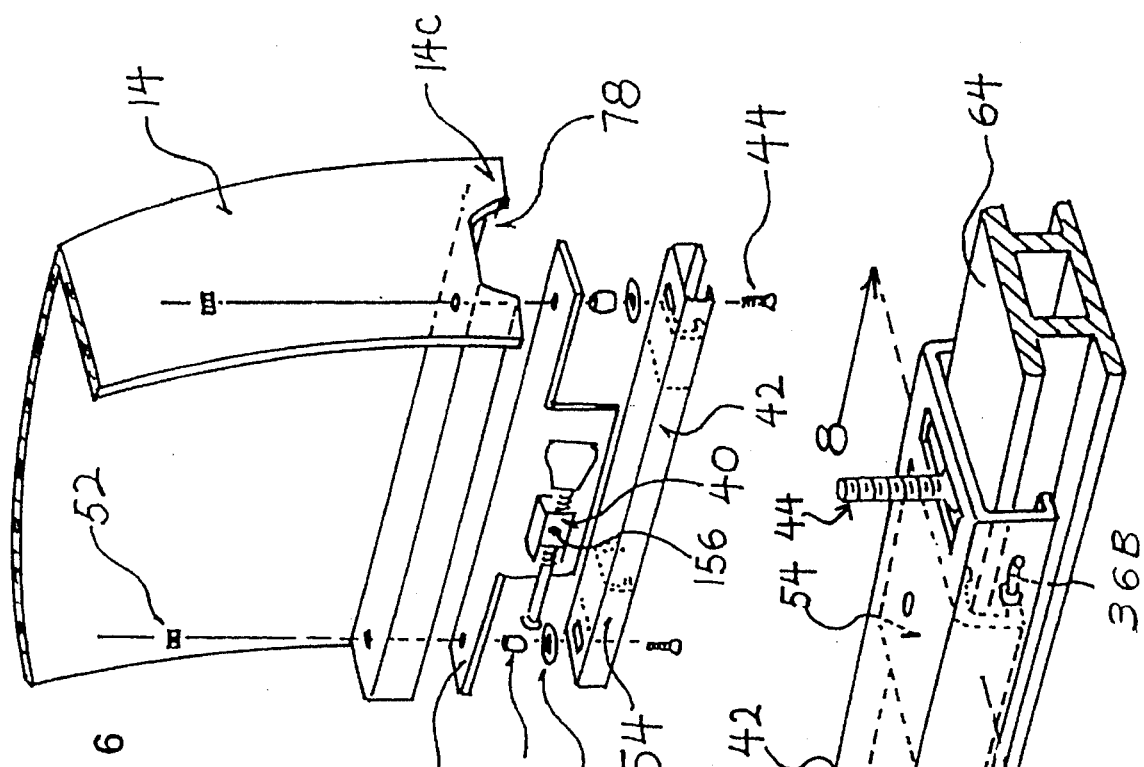
FIG. 6 is a perspective view showing the elements that allow an aft hard shell to be slidably mounted to a glider carriage.
Figure 7:
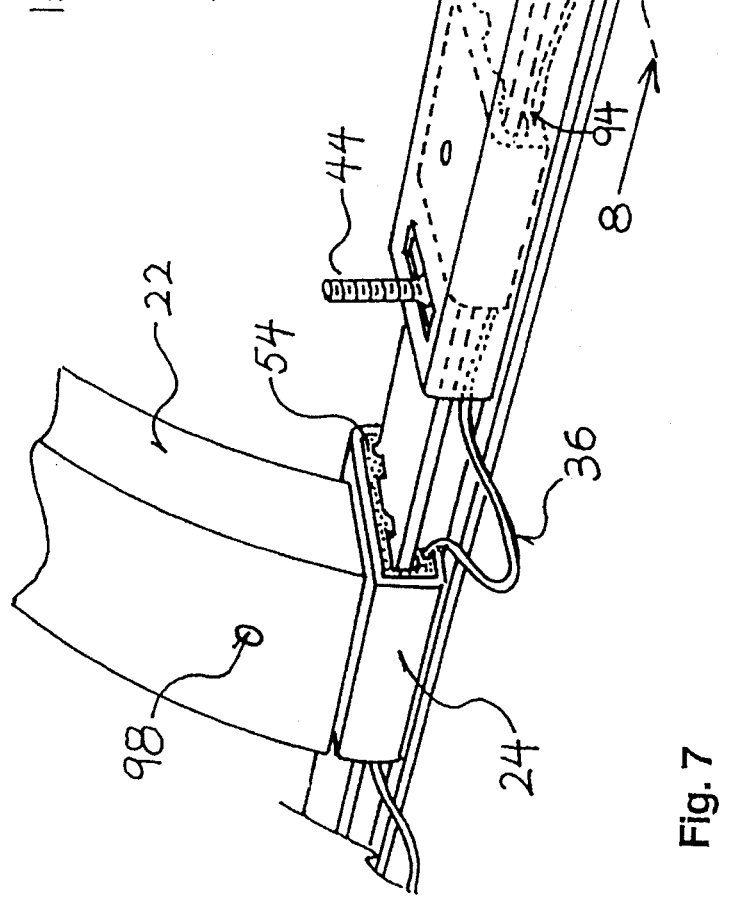
FIG. 7 is a perspective view showing the placement of a rib attached to a rib saddle, a pair of gliders attached over a track, and the partial threading of the canopy tightening cable through a C-channel in the glider.
Figure 8:
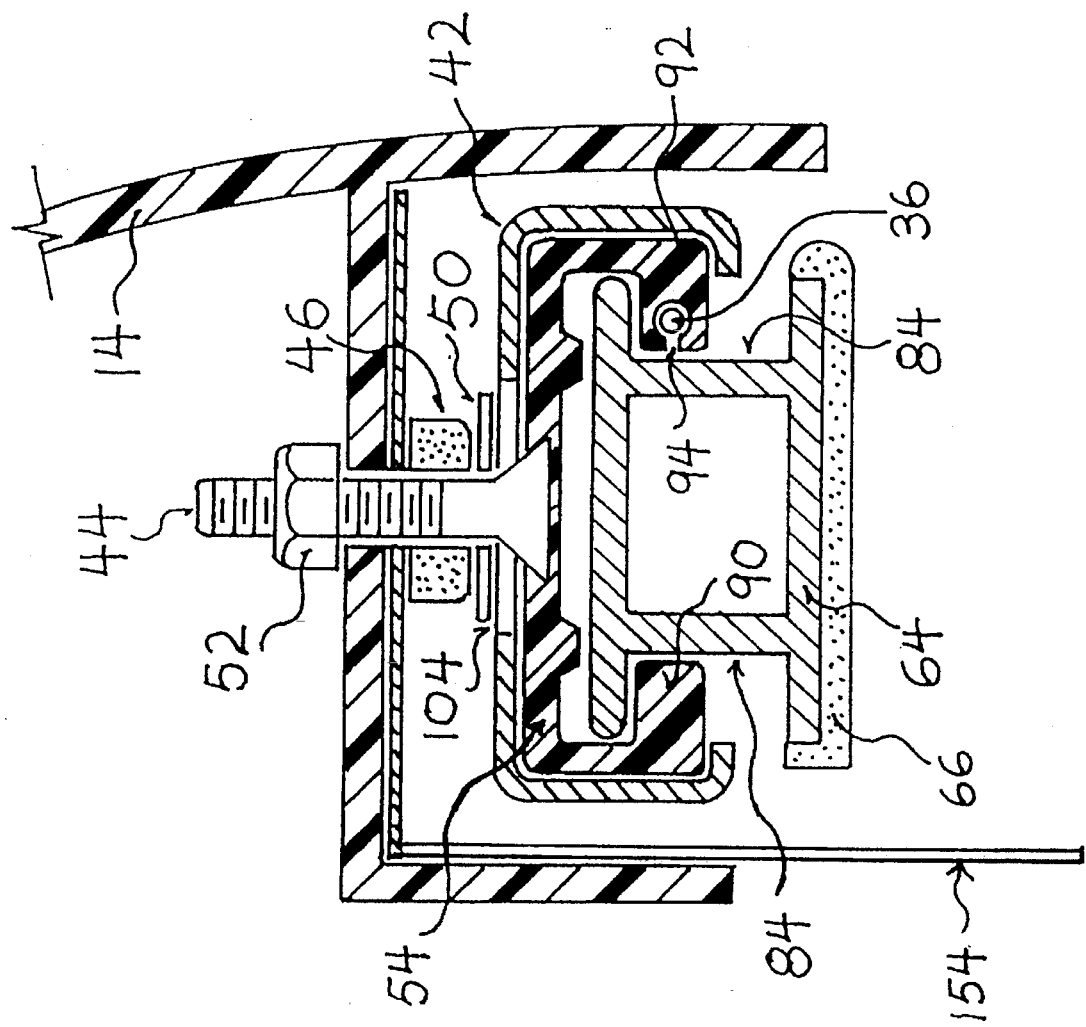
FIG. 8 is sectional view taken along section 8—8 of FIG. 7 showing the attachment configuration of a track, a glider, and a glider carriage.

The aft hard shell 14 which is attached to the back of the canopy 16 is designed to move longitudinally along the truck bed side rails 15. To allow this movement, the aft hard shell includes a pair of glide carriages 42 where each carriage is attached to the respective bottom section 14C of the aft hard shell under a notched cutout 78 as shown in FIG. 6. The glide carriage 42 is then slidably attached to a glider 54 which rides on the tracks 64 as shown in FIGS. 7 and 8, thus enabling the aft hard shell 14 to travel longitudinally along the required length of the tracks 64 which are mounted onto the truck bed side rails 15. Each time the glider 54 traverses across the full length of the track 64, the track is self-cleaned.

Figure 9:
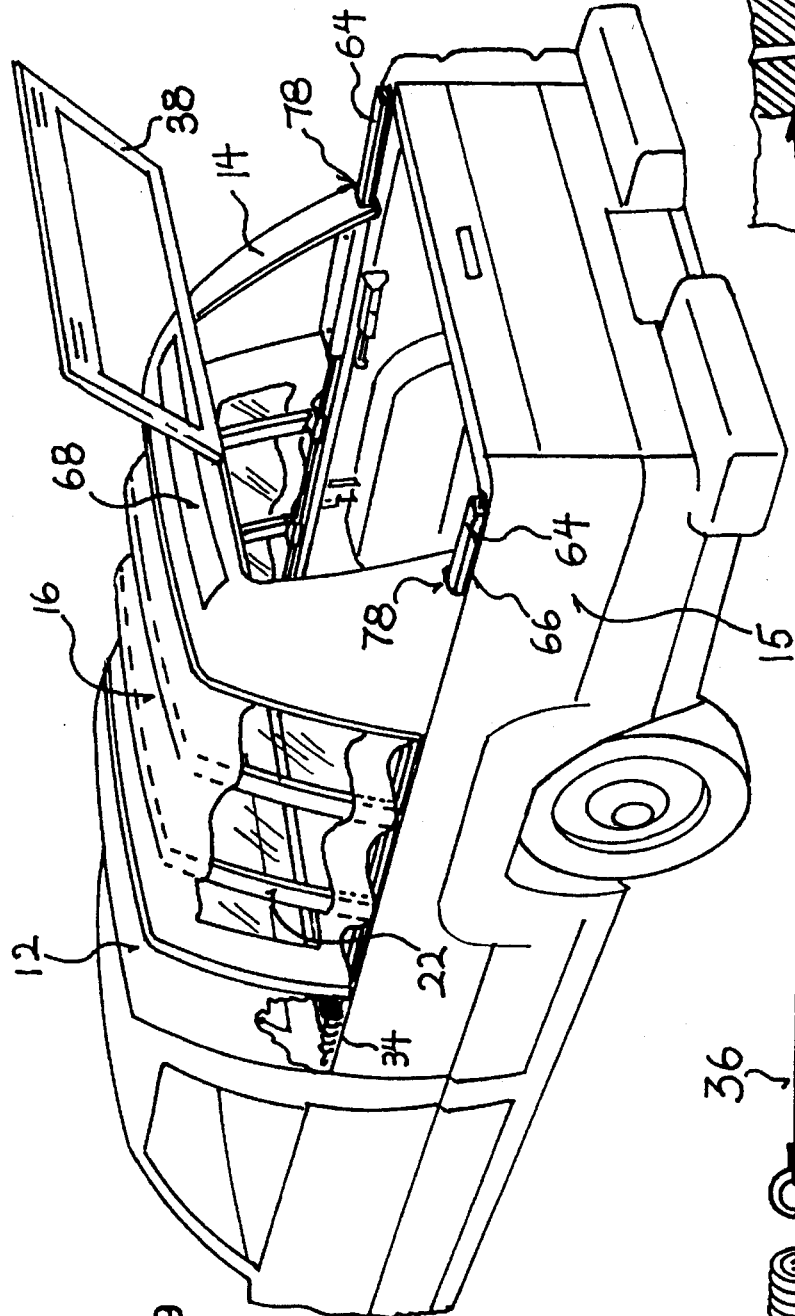
FIG. 9 is a perspective view of a canopy partially extended showing the location of the cable tensioning spring and the traversing of the ribs over the track.

The flexible canopy 16, as shown in FIG. 9, is attached to the set of ribs 22 and is affixed to the fore hard shell portion 12 and the aft hard shell portion 14 by attachment means. The canopy is shown in an enlarged view in FIG. 10, with a flexible, rib attachment flap 18 that is affixed to the ribs 22. The flaps are attached to the inside of the canopy 16 and are wrapped and attached onto the entire rib 22 by an attachment means as shown by the arrows 80 in FIG. 10. The attachment means may consist of a hook and loop fastener such as sold under the trademark VELCRO or a compatible adhesive.

Figure 11:
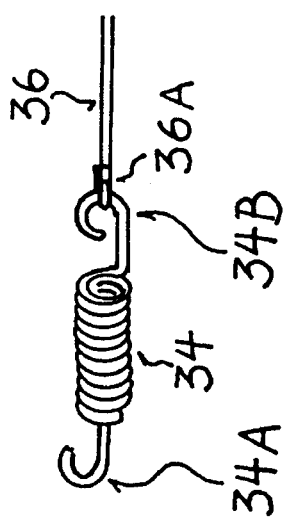
FIG. 11 is a perspective view of the tensioning and the cable tensioning spring.

To tightly seal the lower edges of the flexible canopy to the sides of the truck bed 13, to preclude the ingress of any wind or debris, a canopy peripheral tensioning means is used. The tensioning means as shown in FIGS. 9, 11, and 12 consist basically of a pair of spring 34 as shown in FIG. 11 and a pair of cables 36. Each spring 34, as shown in FIG. 11, is attached within the respective lower side of the fore hard shell 12 and has a front end 34A that is attached to the shell 12 and a back end 34B that attaches to the first end 36A of the cable 36. The second end 36B of the cable is threaded through a set of cable loops 82 located in the periphery of the flexible canopy 16 as best shown in FIG. 12. The threading is continued through a C-channel 94 located on the inside edge of the gliders 54 which are housed within a set of rib saddles 24, and a glider carriage 42 as shown in detail in FIGS. 7, 8, 13, and 14. The termination end of the second end 36B of the cable 36 is finally affixed to the rearmost glider 54 as shown in FIG. 7. When the cover 10 is in its extended position as shown in FIG. 3, the cable 36 pulls against the spring 34 as shown in FIG. 5, drawing the periphery of the flexible canopy 16 securely into an outside channel 84 of the tracks 64 as shown in FIGS. 13 and 14.

Figure 10:
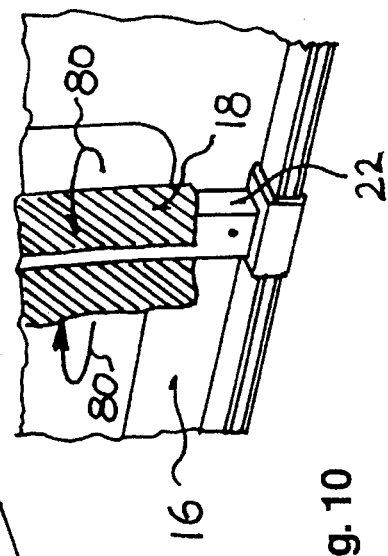
FIG. 10 is a partial perspective view showing one of the flexible canopy flaps being wrapped around a canopy rib.
Figure 15:
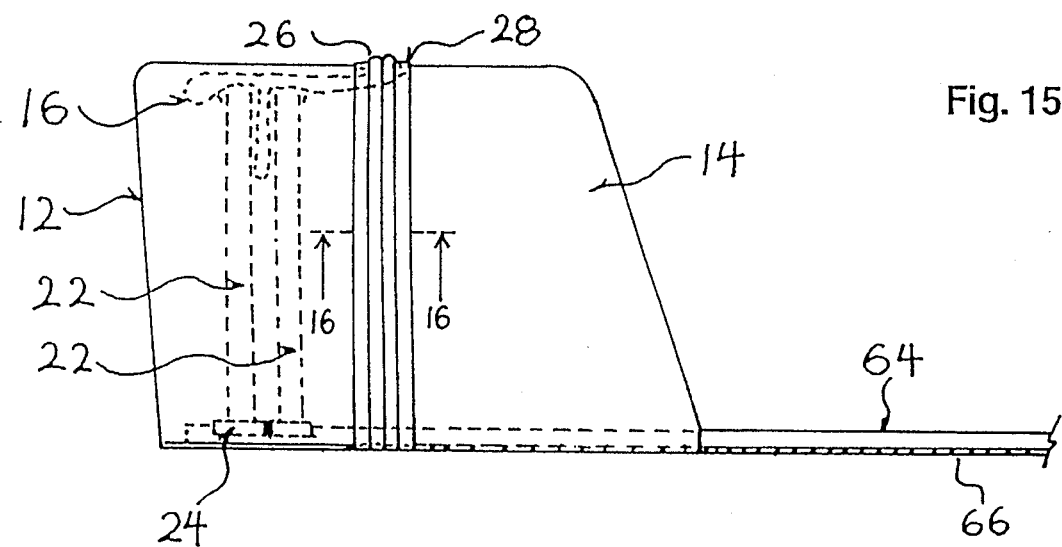
FIG. 15 is a side view showing the fore and aft hard shells attached.
Figure 16:
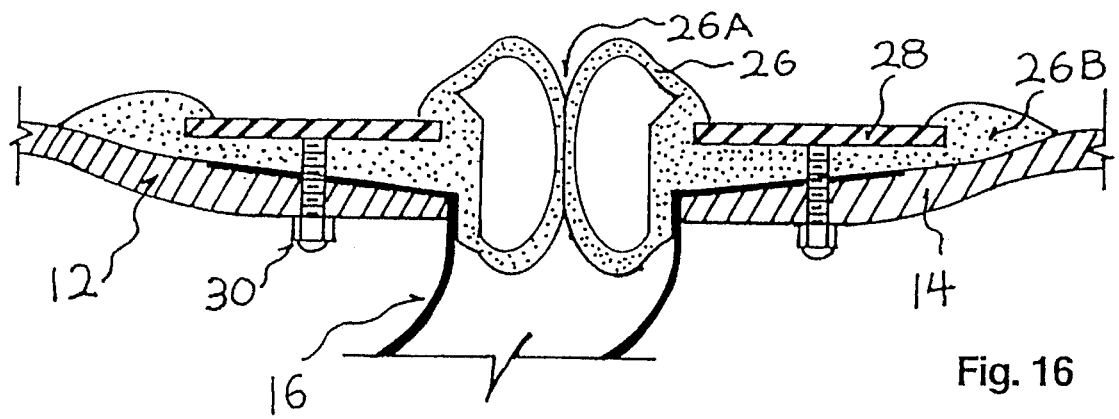
FIG. 16 is a sectional end view taken along section 16—16 of FIG. 15 showing of a pair of shell joint compression seals in their compressed configuration.
Figure 17:
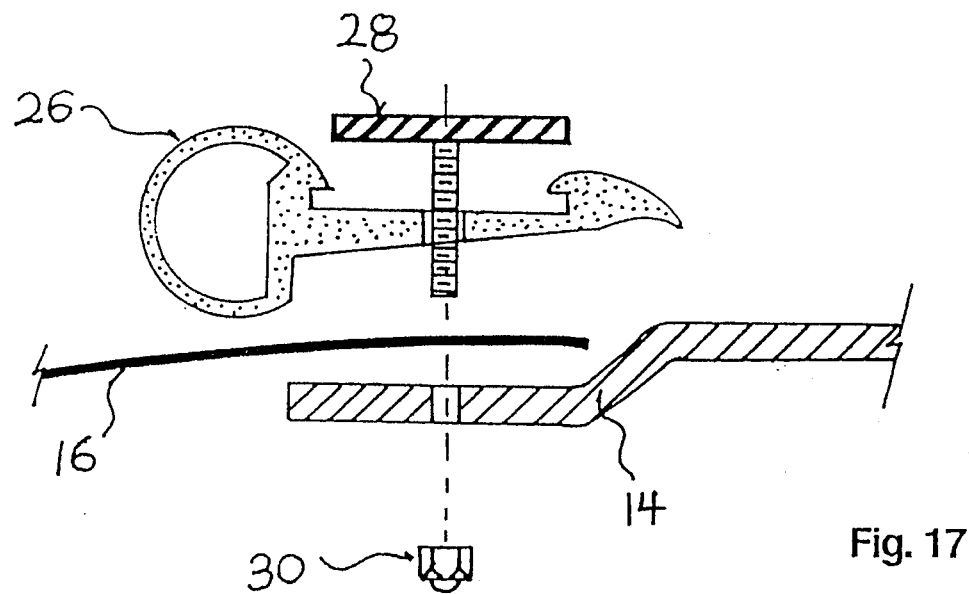
FIG. 17 is a exploded sectional view showing how a shell joint compression seal is attached to either the fore or aft hard shells.

In FIGS. 15, 16, and 17 the front and back ends of the flexible canopy 16 are shown affixed to the fore and aft hard shells 12 and 14, respectively, by means of an attachment assembly as shown best in FIG. 17. The flexible canopy 16 is centrally supported by the ribs 22 as shown in FIGS. 9 and 10. The ribs 22 have a height that is lower than the height of the fore and aft hard shells 12 and 14. This difference in height allows the ribs 22 to be moved in a forward direction and fit into the space of the fore hard shell 12 as shown in FIG. 15. The flexible canopy 16 is attached to the surface of the outer ends of the fore and aft hard shells 12 and 14 by an adhesive. A shell joint compression seal 26, having an outward section 26A that extends over the end of the shells and an inward end 26B that extends over and beyond the glued portion as shown in FIG. 16, is placed over the canopy 16. The seal is held together with a threaded stud trim 28 which is inserted through the entire combination and fastened with a nut 30 as also shown in FIGS. 16 and 17. This shell joint compression seal 26 is designed to perform as a combination gasket which prevents leakage through the mounting holes created by the studded trim 28, and a weathertight seal between the fore and aft hard shells when the cover 10 is in the retracted position with the fore and aft hard shells abutting flushed edge to edge along where the shells joint as shown in FIGS. 2 and 15. When in this retracted position, the cover 16 is compressed together as shown in detail in FIG. 16, by a pair of latching devices 40, as described later and shown in FIG. 18, which locks the cover 10 together in the retracted position with both of the shells on the same level on both the top and sides. The aft hard shell 14 is designed to move along the tracks 64 and is elevated by a spacer gasket 66 so that it is at the same level as the fore hard shell as shown in FIG. 15. The gasket 66 is located under the track 64 and commences at the rear of the truck bed and terminates at the inward lip of the fore hard shell 12 as best shown in FIG. 5.

Figure 19:
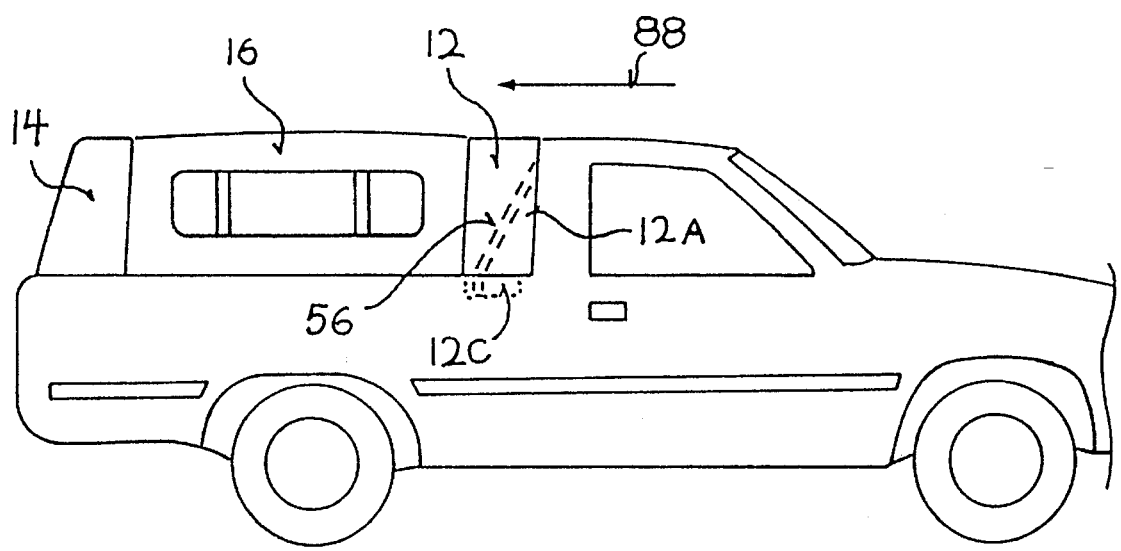
FIG. 19 is a side view of a canopy assembly attached to a pickup truck in the extended position and showing the relative position of the diagonal braces.

As shown in FIGS. 4 and 19, a pair of diagonal braces 56 is disposed within and on each side of the fore hard shell 12. Each brace is placed diagonally between the respective upper corner of the front section 12A and the outward lower corner of the bottom section 12C. These braces offer a strong stabilizing support to the shell against a tension and pulling force 88, as shown in FIG. 19, created by wind or the aft hard shell 14 when the cover 10 is in the extended and taunt position.

The track 64 as shown in FIG. 7 and 8 is designed to function with a glider assembly which includes the rib saddle 24 and glide carriage 42. The track 64 as shown in FIGS. 8 and 13 defines a longitudinally extending channel 84 on each side thereof as shown in FIG. 13. Each channel 84 receives an inwardly directed edge 90 and 92 of the glider 54, which are fastened internally and retained within the rib saddle 24 and glider carriage 42. The glider 54, as shown in FIG. 14, is manufactured from a self-lubricating material, such as a synthetic polyamide material sold under the trademark NYLON, a polytetrafluorethylene sold under the trademark TEFLON, or the like, with two inwardly directed edges 90 and 92, to securely attach itself onto the track 64, thus providing smooth guided longitudinal travel along the track 64.

Figure 20:
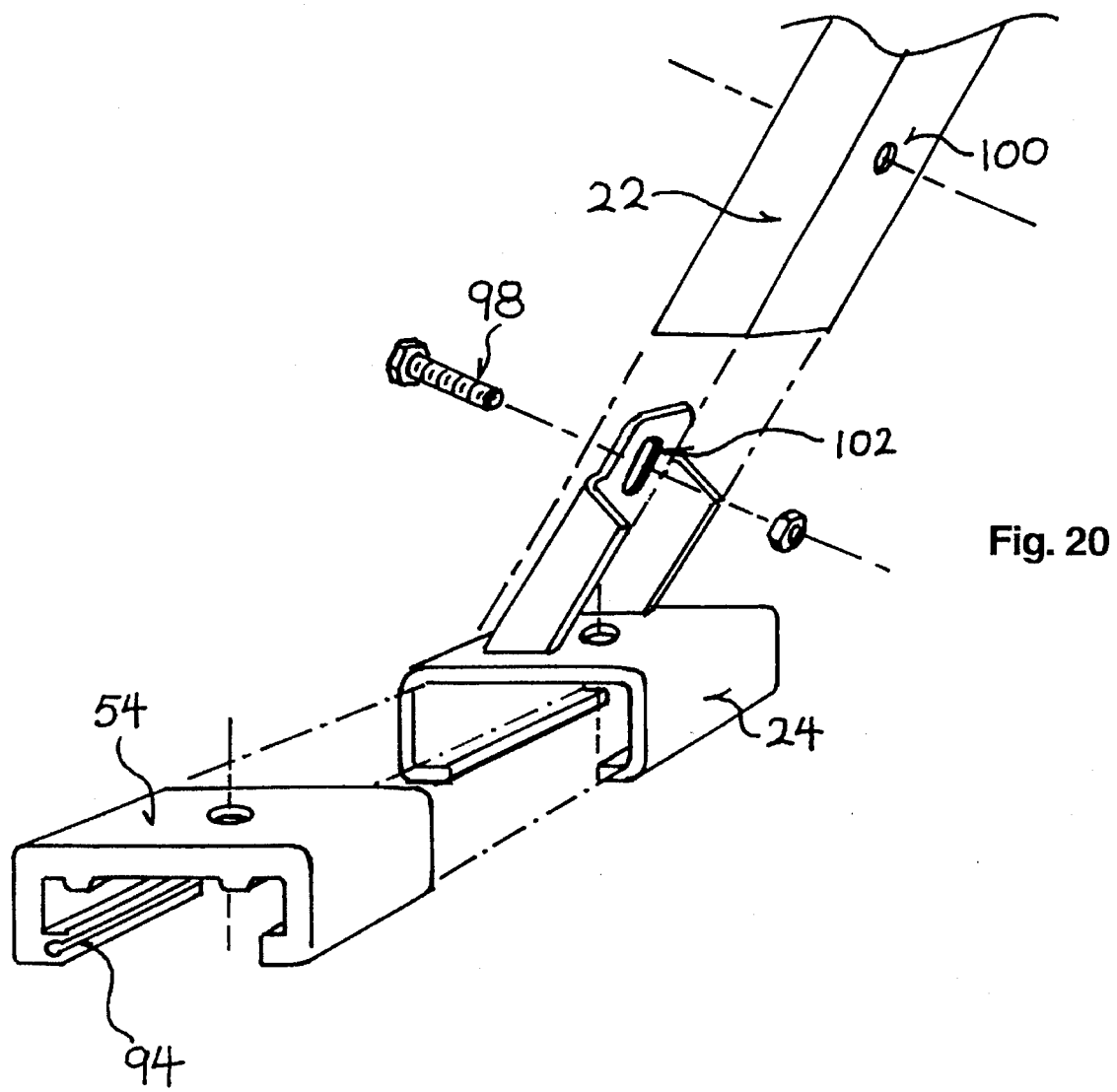
FIG. 20 is a perspective view of a rib attached to a rib saddle that glides along a glider.
Figure 21:
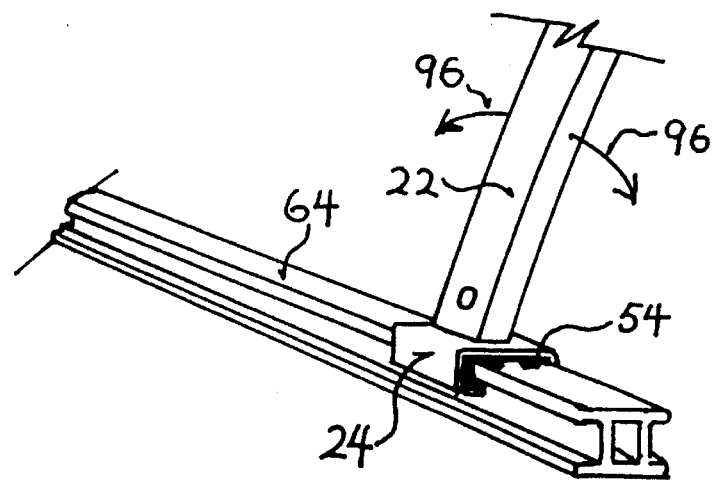
FIG. 21 is a perspective view showing how a rib mounted to a rib saddle and track is provided with a lateral displacement.

The rib saddle 24 as shown in FIGS. 20 and 21 is placed into the lower end of each rib, and preferably is attached by means of a single fastener 98. The saddle is designed to travel longitudinally along the track and to provide a pivoted connection between the rib 22 and the track 64. The pivoting allows forward and backward movement 96 of the ribs during the extending and retracting process of the canopy 10. This feature eliminates the binding of the ribs onto the tracks created by uneven leveraging of the ribs, more particularly caused by the weight of the flexible canopy 16, therefore ensuring smooth movements. The ribs 22 are attached to the rib saddle 24, as shown in FIG. 20, by means of a tubular fastening device 98, inserted through a hole 100 at the base of the rib 22 and through a slotted hole 102 of the rib saddle 24.

Figure 22:
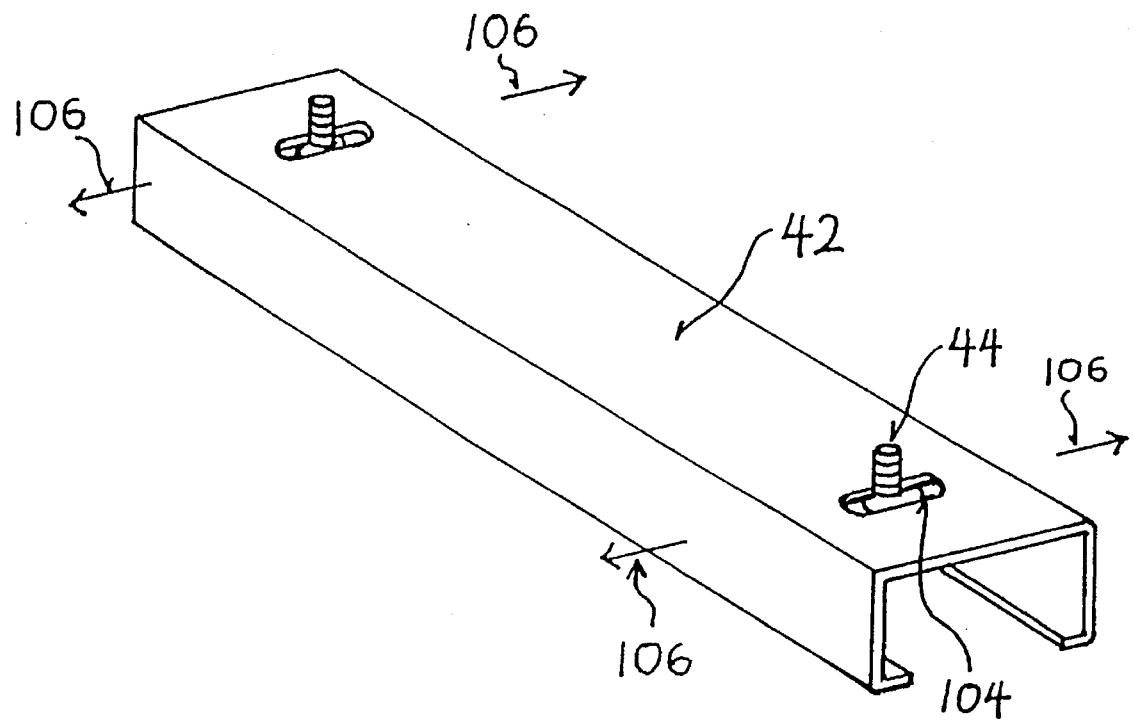
FIG. 22 is a perspective view of a glider carriage showing the location of the slotted hole that allows the glider carriage to compensate for dimensional inconsistencies in the truck bed rail.

The self-adjusting feature and function of the glide carriage 42 is shown in FIGS. 6, 8, and 22. The glide carriage 42 houses the set of gliders 54 and is fastened to the base of the aft hard shell. As shown in the exploded view of FIG. 6, the glider carriage is fastened with a tapered/countersunk bolt 44 inserted through a horizontally transverse slot 104, incorporating a compression spring 46, that preferably consists of a urethane spring on top of a plastic/nylon type washer 50, and held together with a lock nut 52 as shown in FIG. 8.

Figure 23:
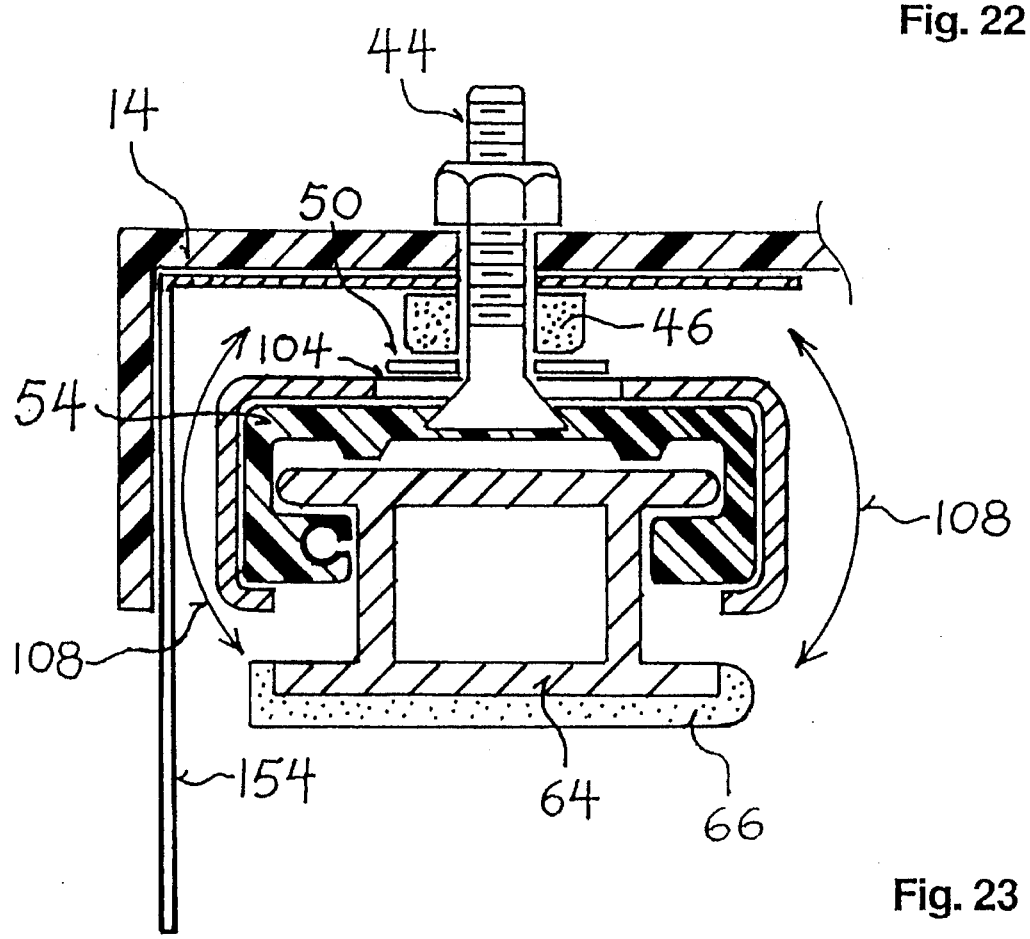
FIG. 23 is a sectional end view similar to that of FIG. 8 showing the tilt movement provided by the glider carriage.

The compression spring 46 maintains the required compression pressure along with the plastic/nylon washer 50 as shown in FIGS. 7, 8, and 23. The slot 104 on the glide carriage 42, through which the bolt 44 is inserted, provides a limited lateral travel, thus enabling the glide carriage 42 to easily slide laterally, as indicated by arrows 106 in FIG. 22; and to tilt sideways, as indicated by arrows 108, for self-adjustment as shown in FIG. 23 while the bolt 44 remains in a stationary position. The lateral movement 106, and tilt capability 108 of the glide carriage 42 mounted within the aft hard shell, form the self-adjusting features which overcome the irregularities of the truck bed side rails 15 including uneven widths and varying angles.

Figure 18:
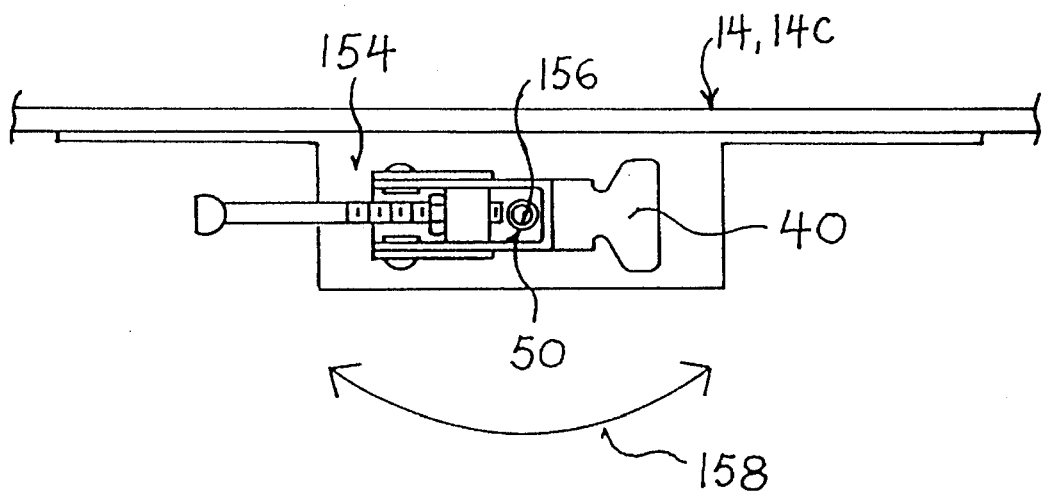
FIG. 18 is a side view of a latch used to secure the aft hard shell in either the retracted or extended position.

The latch device 40, as shown in FIGS. 6 and 18, is a tension imparting latch that is mounted with a single rivet type fastener 156, having a nylon washer 50 inserted between the latch 40 and a latch mounting plate 154. This latching device allows a 180 degree swivel action, indicated by the arrow 158, providing the function of locking the aft hard shell in both the extended and retracted positions.

Figure 24:
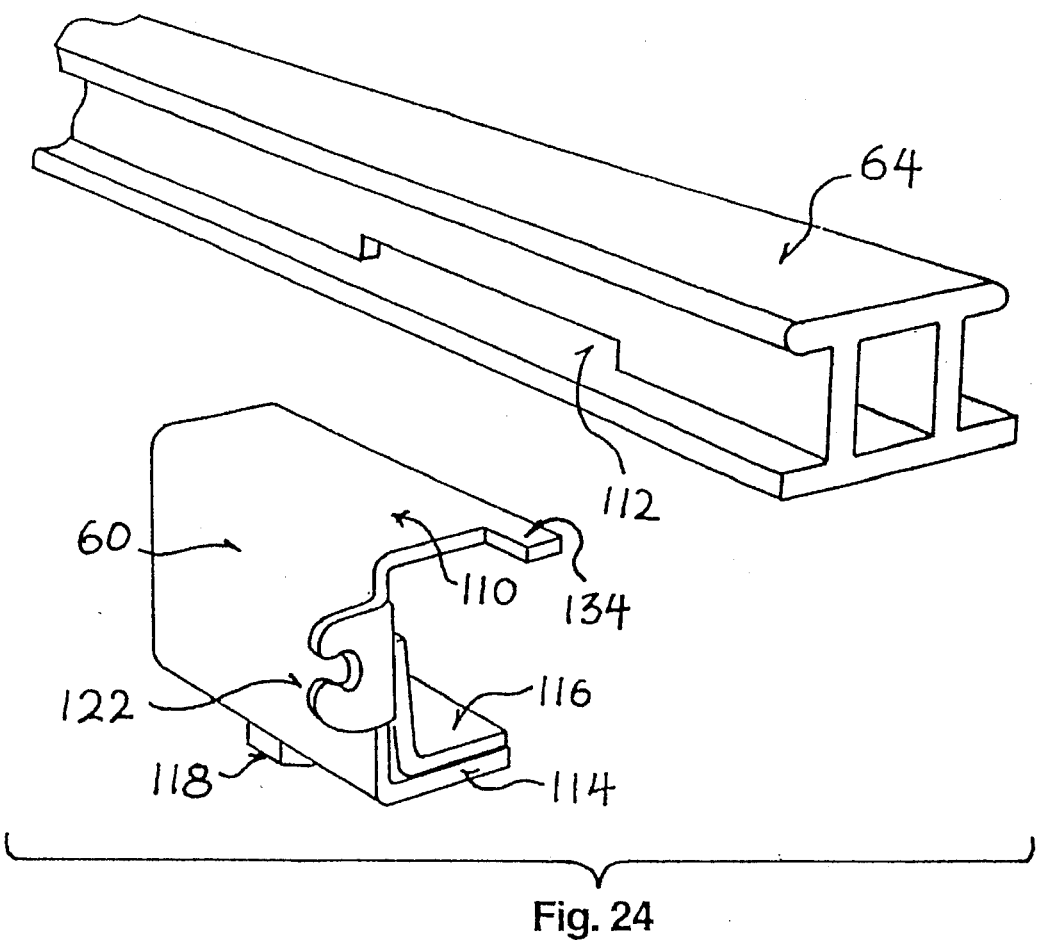
FIG. 24 is a perspective view showing the slots on the side of the track into which is inserted the locking flange of a C-clamp.
Figure 25:
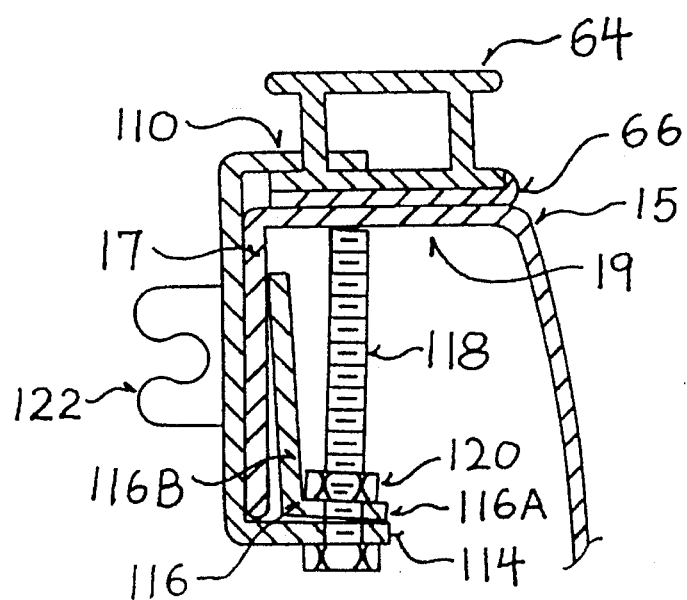
FIG. 25 is a side sectional view taken along section 25—25 of FIG. 5 showing how the track is held firm against the truck bed side rail by means of a C-clamp mounting bolt and an obtuse angled L-bracket.

The track 64, as shown in FIGS. 5, 24, and 25, is secured to the top of the upper bed side rail 15 by means of a plurality of C-clamps 58, 60, and 62 as shown in detail in FIG. 5. Although the main purpose of these clamps is to secure the tracks onto the truck bed, these individual clamps include features that provide other functions as described below. More particularly as shown in FIGS. 24 and 25, each C-clamp 58, 60, and 62 includes a locking top lip 110 that is inserted into a corresponding slot 112 located on the inside bottom edge of the track 64 as shown in FIG. 24. The C-clamp has a bottom lip 114 that is inserted under the vertical lip of the upper truck bed rails 15. An L-bracket 116 which is located inside each of the C-clamps 58, 60, 62 includes a horizontal side 116A and a vertical side 116B as shown in FIG. 25. The horizontal side rests on top of the bottom lip 114 and the vertical side, which is designed with an obtuse angle, rests against the inside surface of the upper truck bed rails 15 as best shown in FIG. 25.

To functionally attach the L-bracket 116 to the C-clamp 60, a bolt 118 is inserted through the two bores located on the bottom lip 114 of the C-clamp and the horizontal side 116A of the L-bracket. A nut 120 is then threaded into the bolt 118 whereupon when the bolt is tightened, it pushes upwards against the underside 19 of the truck bed rails drawing the track 64 down tight. Simultaneously, the L-bracket 116, as it bottoms out on the flat bottom lip 114, applies a lateral pressure against the sandwiched vertical lip 17 of the truck bed side rails 15. Thus, a bilateral track securing force is created that secures the track to the rails. The C-clamp 60 also positions the tracks 64 securely in place as well as reinforcing the keeper flange 122, which provides a strong lateral anchoring support against the pulling force of the latch mechanism 40 as shown in FIGS. 5, 24, and 25.

FIG. 5 shows the three different types of C-clamps in their various functions. The fore hard shell C-clamp 58 is disposed over the lower inside lip of the fore hard shell 12, and secures it to the truck bed side rail 15. The front shell C-clamp 58 incorporates a spring holder 124 to which the cable tension spring 34 is affixed and also retains the threaded bolts 126 and 128. The bolt 126 with the nut 130 is used to retain the track 64 into its pre-determined position on the truck bed side rail 15. The bolt 128 and nut 132 are used to fasten the bottom end of the diagonal brace 56 securely into position. The C-clamp 62, which mounts flush with the inside of the truck bed side rail 15, is used to secure the track 64 onto the truck bed side rail 15, as do the C-clamps 60. The C-clamps 60 are designed with an extended keeper flange 122 which is used to receive and retain the latch device 40 and to secure the aft hard shell 14 in either the extended or retraced position. The C-clamp 60 as shown in FIG. 24 also incorporates an extended flange 134 located on the top lip 110 of the C-clamp. This flange locks into the sides of the tracks 64 through the slots 112 and also counters the leveraging force exerted by the tension of the latch device 40 onto the keeper 122 of the C-clamps 60.

The mid-gate assembly, as shown in FIG. 26 in a cut away illustration for clarity, reveals the mid-gate liner 72 that is disposed above the corrugated truck bed deck 21 of the truck bed 13 and that extends forward of the mid-gate 70.

Referring now more particularly to FIGS. 26, 27, 28, 29, 30, and 31, the mid-gate and liner assembly is shown in detail. The mid-gate 70 is seated upon the mid-gate liner 72 which is inserted into and rests directly upon the upper level 23 of the corrugated deck 21 in the forward one-third portion of the truck bed 13. The mid-gate liner 72 may be constructed of any desired material but preferably is a molded plastic material such as polyvinyl, polyethylene, ABS, or the like. The mid-gate liner, as best illustrated in FIGS. 27 and 28, is formed with a laterally transverse recess 136 shown in a detailed side view in FIG. 28. The recess 136 receives the bottom end 138 of the mid-gate 70. As illustrated in FIGS. 27 and 28, the disposition of the mid-gate liner 72 on top of the corrugated deck 21 together with the mid-gate 70 defines an enclosed protected space. Within this space, items may be stowed and kept dry from water, snow, or other foreign debris that may fall into the rear section of the bed aft of the mid-gate 70, particularly when the cover 10 is in its retracted and stowed position as shown in FIG. 26. Shown more particularly in FIG. 31, a false bottom is provided by the mid-gate liner 72 so that, for example, any accumulation of water can move freely and drain normally along the lower level 25 of the corrugated deck 21 of the truck bed 13 while items on top of the mid-gate liner 72 remain isolated therefrom.

Figure 29:
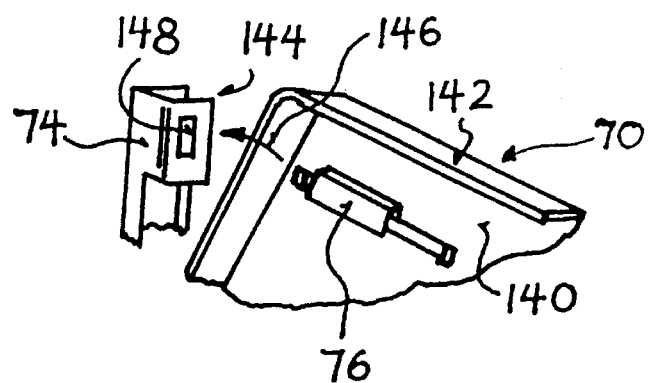
FIG. 29 is a perspective detailed view of the mid-gate latch and keeper.
Figure 30:
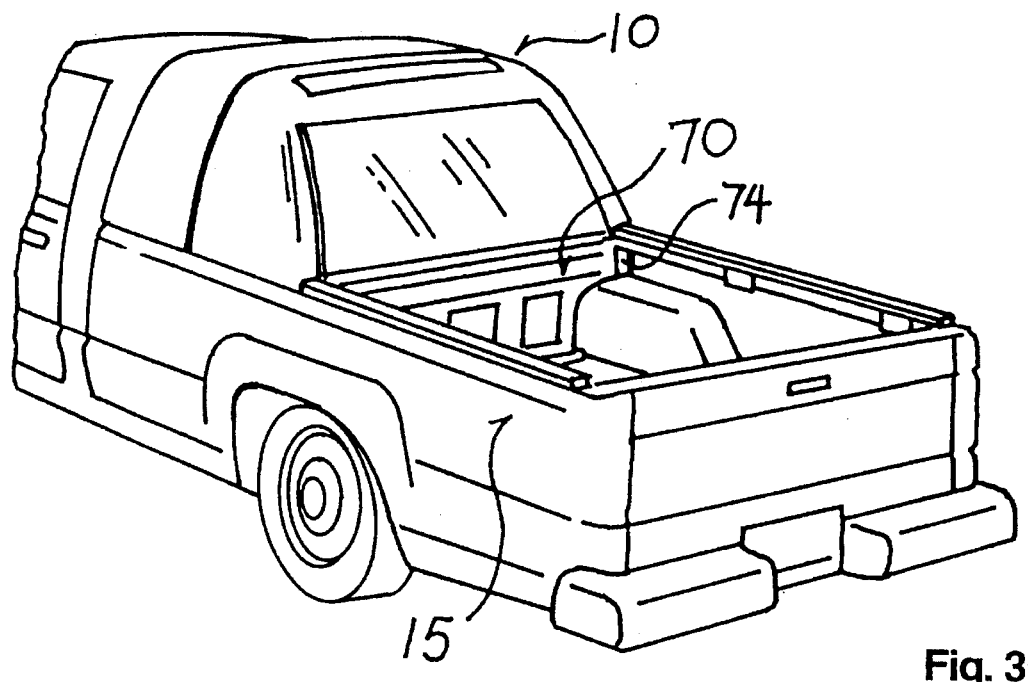
FIG. 30 is a perspective view of a mid-gate fully installed below the aft hard shell.
Figure 31:
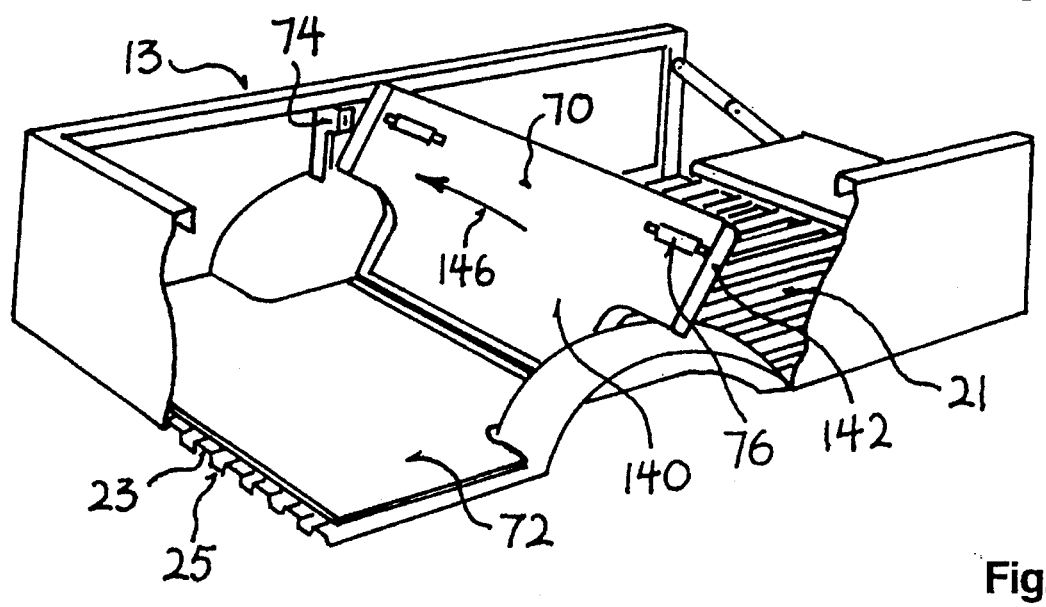
FIG. 31 is a perspective view showing the location of the two mid-gate latches and mid-gate keepers used to secure the mid-gate.

The mid-gate 70 as shown in FIG. 27 and partially in FIGS. 28 and 29 includes a vertical wall 140 surrounded by a flange 142. The flange 142 is fitted within a channel 144 defined by a mid-gate keeper 74. To secure the mid-gate 70 it is inserted into the lateral transverse recess 136 and then rotated forwardly as is illustrated by the arrows 146. Once in position, a set of mid-gate latches 76 are inserted into the locking slots 148 of the mid-gate keepers 74. Thus, the combination mid-gate latch and keeper retain the mid-gate 70 in a securely locked position. As more particularly shown in FIGS. 30 and 31, the mid-gate keeper 74 is attached to the inner surface of the truck bed side rails 15. This closes the gap between the mid-gate 70 and the interior walls of the truck bed side rails 15 to keep foreign debris out of the protected area created.

While the invention has been described in complete detail and pictorially shown in the accompanying drawings, it is not to be limited to such details, since many changes and modifications may be made to the invention without departing from the spirit and the scope thereof. Hence, it is described to cover any and all modifications and forms which may come within the language and scope of the claims.

I claim:

1. A two-position collapsible canopy assembly that attaches to a rearward extending bed of a pickup type truck, said truck bed having front, rear, and side walls with upper truck bed rails, a corrugated truck bed deck, and a front cab having a backside, said assembly comprising:
   a) a track secured to a top of the upper truck bed rails by a plurality of C-clamps that each comprises:
      (1) a locking top lip inserted into a corresponding slot located on a bottom edge of said track,
      (2) a bottom lip having a bore therethrough and inserted under a vertical lip of the upper truck bed rails,
      (3) an L-bracket with a horizontal side that sits on top of the bottom lip and has a bore therethrough, and a vertical side designed with an obtuse angle that rests against an inside surface of the upper truck bed rails,
      (4) a bolt inserted through the bore located on the bottom lip of said C-clamp and the horizontal side of the L-bracket, and
      (5) a nut threaded onto the bolt whereupon when the bolt is tightened, it pushes upwards against an underside of the truck bed rails drawing said track down tight, and simultaneously the L-bracket, as it bottoms out on the bottom lip of said C-clamp, applies a lateral pressure against the sandwiched vertical lip of the upper truck bed rails to thus create a bilateral track securing force,
   b) a fore hard shell having a front section, a back section, and a bottom section, where the front section is placed against the backside of the front cab and the bottom section has means for being securely attached to the upper truck bed rails,
   c) an aft hard shell having a front section, a back section, and a bottom section having means for being slidably attached to said track,
   d) a plurality of ribs having means for being slidably attached to said track,
   e) a flexible canopy having terminating side ends, a front end, and a back end, where the side ends are attached to said ribs and said track by an attachment means and the front and back ends are rigidly attached to said fore hard shell and said aft hard shell respectively by an attachment means, where said attached canopy can be placed in either a forward retracted position or in an extended position that covers a length of the truck bed, and
   f) a mid-gate having means for being removably secured around the bottom section of said aft hard shell, the truck's side walls, and a liner located above the corrugated truck bed deck.

2. A two-position collapsible canopy assembly that attaches to a rearward extending bed of a pickup type truck, said truck bed having front, rear, and side walls with upper truck bed rails, a corrugated truck bed deck, and a front cab having a backside, said assembly comprising:
   a) a track having means for being secured to a top of the upper truck bed rails,
   b) a fore hard shell having a front section, a back section, and a bottom section, where the front section is placed against the backside of the front cab and the bottom section has means for being securely attached to the upper truck bed rails,
   c) an aft hard shell having a front section, a back section, and a bottom section having means for being slidably attached to said track,
   d) a plurality of ribs having means for being slidably attached to said track,
   e) a canopy having terminating side ends, a front end, a back end, and a canopy attachment means comprising:
      (1) a rib attachment means comprising a flexible, rib attachment flap attached to an inside of said canopy and wrapped around and attached to each said rib by a hook and loop fastener or an adhesive, and
      (2) a fore and aft hard shell attachment means comprising:
         (a) an adhesive applied to a surface of outer ends of said fore and aft hard shells where the adhesive forms a glued portion to which is placed the front and back ends of said canopy,
         (b) a shell joint compression seal placed over the glued portion of said canopy where said seal has an outward section that extends over the outer ends of said shells and an inward end that extends inward over and beyond the glued portion, and
         (c) a threaded stud trim disposed over and fastened to said shell joint compression seal by a set of nuts, where the combination of the adhesive, the seal, and the trim serves as a gasket which functions as a weathertight seal between said fore and aft hard shells, and where said attached canopy can be placed in either a forward retracted position or in an extended position that covers a length of the truck bed, and
   f) a mid-gate having means for being removably secured around the bottom section of said aft hard shell, the truck's side walls, and a liner located above the corrugated truck bed deck.

3. A two-position collapsible canopy assembly that attaches to a rearward extending bed of a pickup type truck, said truck bed having front, rear, and side walls with upper truck bed rails, a corrugated truck bed deck, and a front cab having a backside, said assembly comprising:
   a) a track having means for being secured to a top of the upper truck bed rails,
   b) a fore hard shell having a front section, a back section, a bottom section, a top, and sides, where the front section is placed against the backside of the front cab and the bottom section has means for being securely attached to the upper truck bed rails,
   c) an aft hard shell having a top, sides, a front section, a back section, and a bottom section having means for being slidably attached to said track,
   d) a plurality of ribs having means for being slidably attached to said track,
   e) a canopy having terminating side ends, a front end, a back end, and a canopy attachment means comprising:
      (1) a rib attachment means comprising a flexible, rib attachment flap attached to an inside of said canopy and wrapped around and attached to each said rib by a hook and loop fastener or an adhesive, and
      (2) a fore and aft hard shell attachment means comprising:
         (a) an adhesive applied to a surface of outer ends of said fore and aft hard shells where the adhesive forms a glued portion to which is placed the front and back ends of said canopy,
         (b) a shell joint compression seal placed over the glued portion of said canopy where said seal has an outward section that extends over the outer ends of said shells and an inward end that extends inward over and beyond the glued portion, and
         (c) a threaded stud trim disposed over and fastened to said shell joint compression seal by a set of nuts, where the combination of the adhesive, the seal, and the trim serves as a gasket which functions as a weathertight seal between said fore and aft hard shells, wherein when said fore and aft hard shells abut together, a tight, weatherproof seal is formed while keeping both said on a same even level on both the top and the sides of said shells, where said attached canopy can be placed in either a forward retracted position or in an extended position that covers a length of the truck bed, and
   f) a mid-gate having means for being removably secured around the bottom section of said aft hard shell, the truck's side walls, and a liner located above the corrugated truck bed deck.

4. A two-position collapsible canopy assembly that attaches to a rearward extending bed of a pickup type truck, said truck bed having front, rear, and side walls with upper truck bed rails, a corrugated truck bed deck, and a front cab having a backside, said assembly comprising:
   a) a track secured to a top of the upper truck bed rails,
   b) a fore hard shell having a front section, a back section, and a bottom section, where the front section is placed against the backside of the front cab and the bottom section has means for being securely attached to the upper truck bed rails,
   c) an aft hard shell having a front section, a back section, and a bottom section,
   d) a plurality of ribs having means for being slidably attached to said track,
   e) a flexible canopy having terminating side ends, a front end, and a back end, where the side ends are attached to said ribs and track by an attachment means and the front and back ends are rigidly attached to said fore hard shell and said aft hard shell respectively by an attachment means, where said attached canopy can be placed in either a forward retracted position or in an extended position that covers a length of the truck bed,
   f) a mid-gate having means for being removably secured around the bottom section of said aft hard shell, the truck's side walls, and a liner located above the corrugated truck bed deck,
   g) a plurality of glide carriages interposed between said aft hard shell and said track for facilitating reciprocal movement of said aft hard shell along said track, with each glide carriage having a plurality of horizontally transverse slots therethrough and a plurality of bolts with mating nuts and compression springs with the bolts penetrating the slots and the springs displaced over the bolts with the nuts holding said aft hard shell to said glide carriages at a suitable angle to provide a self-adjusting glide carriage that compensates for inconsistencies in width and irregularities of the truck bed rails, and
   h) a canopy peripheral tensioning means that tightly seals the terminating side ends of said canopy to the truck bed rails to preclude ingress into said canopy of any wind or debris, said canopy peripheral tensioning means comprising:
      (1) a spring attached within each lower side of said fore hard shell, with each said spring having a front end that attaches to said fore hard shell and a back end, and
      (2) a pair of cables with each said cable having a first end that attaches to the back end of said respective spring and a second end that is threaded through a set of cable loops located at lower edges of said canopy and through a plurality of C-channels located on an inside edge of a glider which rides on said track, where a terminating end of the second end of each said cable is finally affixed to a last said glider, thus tightly sealing the lower edges of said canopy to sides of the truck bed rails.

5. A two-position collapsible canopy assembly that attaches to a rearward extending bed of a pickup type truck, said truck bed having front, rear, and side walls with upper truck bed rails, a corrugated truck bed deck, and a truck cab having a backside, said assembly comprising:
   a) a track secured to a top of the upper truck bed rails by a plurality of C-clamps,
   b) a fore hard shell having a front section, a back section, and a bottom section, where the front section is placed against the backside of the truck cab via a rubber gasket and with the bottom section further having an inward lip that is sized to fit over the upper truck bed rails and attached thereto by a plurality of C-clamps,
   c) an aft hard shell having a front section, a back section, and a bottom section having a notched cutout that attaches to a glide carriage that travels longitudinally along said track,
   d) a plurality of ribs each slidably attached to said track by a rib saddle that is attached to a lower end of each said rib, where each saddle is designed to travel longitudinally along said track, e) a flexible canopy having:
 (1) a rib attachment means comprising a flexible, rib attachment flap attached to terminating side ends of said canopy and wrapped around and attached to said ribs by a hook and loop fastener or an adhesive onto a lower section of each said rib, and
 (2) a fore and aft hard shell attachment means comprising:
  (a) an adhesive applied to a surface of outer ends of said fore and aft hard shells where the adhesive forms a glued portion to which is placed the front and back ends of said canopy, and
  (b) a shell joint compression seal placed over the glued portion of said canopy where said seal has an outward section that extends over the outer ends of said shells and an inward end that extends inward over and beyond the glued portion,
f) a canopy peripheral tensioning means that tightly seals lower edges of said canopy to sides of the truck bed rails to preclude ingress of any wind or debris, said canopy peripheral tensioning means comprising:
 (1) a spring attached within each lower side of said fore hard shell, each said spring having a front end that attaches to said fore hard shell and a back end, and
 (2) a pair of cables each having a first end that attaches to the back end of each said spring and a second end that is threaded through a set of cable loops located at the lower edges of said canopy and through a plurality of C-channels located on an inside edge of a glider which rides on said track, where a terminating end of the second end of each said cable is finally affixed to a last said glider, thus tightly sealing the lower edges of said canopy to the sides of the truck bed rails,
g) a mid-gate removably secured around the bottom section of said aft hard shell, the truck's side walls, and the corrugated truck bed deck, and
h) means for removably securing said midgate, where said mid-gate is removably secured by:
 (1) inserting a bottom of said mid-gate into a horizontally transverse recess located across a mid-gate liner disposed upon said truck bed deck and extending forward of said mid-gate, where said liner defines a surface disposed above and displaced from the corrugated truck bed deck to define a false bottom, and
 (2) a combination mid-gate latch and keeper located at each side of said mid-gate and the side walls of the truck respectively, where said combination mid-gate latch and keeper provides a means for allowing said mid-gate to be removably secured.

* * * * *